United States Patent [19]

Nomura et al.

[11] 4,441,011

[45] Apr. 3, 1984

[54] ROTARY ARC-WELDING METHOD

[75] Inventors: Hirokazu Nomura; Yuji Sugitani, both of Tsu, Japan

[73] Assignee: Nippon Kokan Kabushiki Kaisha, Tokyo, Japan

[21] Appl. No.: 396,909

[22] PCT Filed: Nov. 27, 1981

[86] PCT No.: PCT/JP81/00357
§ 371 Date: Jul. 2, 1982
§ 102(e) Date: Jul. 2, 1982

[87] PCT Pub. No.: WO82/01839
PCT Pub. Date: Jun. 10, 1982

[30] Foreign Application Priority Data

Nov. 28, 1980 [JP] Japan .................. 55-166719

[51] Int. Cl.³ .............................. B23K 9/12
[52] U.S. Cl. .................. 219/124.34; 219/124.03
[58] Field of Search ............ 219/124.03, 124.22, 219/124.34

[56] References Cited

U.S. PATENT DOCUMENTS

| 4,249,061 | 2/1981 | Puschner | 219/124.22 |
| 4,316,075 | 2/1982 | Isoya et al. | 219/124.22 |
| 4,328,416 | 5/1982 | Dudley et al. | |
| 4,350,868 | 9/1982 | Takagi et al. | 219/124.22 |

Primary Examiner—C. C. Shaw
Attorney, Agent, or Firm—Frishauf, Holtz, Goodman & Woodward

[57] ABSTRACT

A welding method comprises rotating a nozzle (3) provided with a welding electrode (9) eccentrically from the center axial line (a) thereof within a groove (2). The center axial line (a) of the nozzle is aligned with the center of the groove (2) by smoothing values of variation in welding current or welding voltage for each of the left and right half cycles of the nozzle and controllably moving the nozzle horizontally at right angles to the welding direction so that the difference between these values becomes null. The height of the nozzle (3) relative to the groove (2) is maintained at a prescribed distance by smoothing values of variation in welding current or welding voltage and controllably moving vertically the nozzle (3) so that the difference between the thus smoothed value and a set value becomes null.

2 Claims, 8 Drawing Figures

ROTARY ARC-WELDING METHOD

FIELD OF THE INVENTION

The present invention relates to a rotary arc-welding method for carrying out a welding by causing an arc produced from a welding electrode to follow a circular movement.

BACKGROUND OF THE INVENTION

When welding the objects of welding such as thick steel plates by arc welding with a V-shaped or X-shaped groove formed between the objects of welding, the large space in the groove requires a large heat input. This causes such problems as the decrease in toughness of the welding heat affected zone.

To solve the above-mentioned problem, a conceivable method is to form an I-shaped groove, i.e., to form a narrow groove having groove faces facing each other in parallel with a narrow width. By this method, however, it is impossible to cause the arc to reach sufficiently to every corner of the groove to achieve satisfactory penetration into corners and to form a sound welding bead.

As a conventional method to solve the above-mentioned problem, a method is known which comprises carrying out a welding while causing oscillation of the tip of a welding electrode (hereinafter simply referred to as an "electrode") inserted into said narrow groove at a certain frequency in the width direction of the groove.

The above-mentioned welding method is however problematic in: that variation in the bending deformation of the electrode causes variation in the distance between the tip of electrode and the groove, making it impossible to obtain a stable arc; that a complicated oscillation mechanism of electrode is required; that, unless an oscillation width is strictly set up in response to the groove width, an excessive penetration into the objects of welding is caused by the electrode becoming too close to the groove face, and this may cause undercut or contact of the electrode with the groove face, resulting in short circuit of welding electrode; and furthermore, that a defective fusion may be caused at the lap portion of two adjacent beads because of the limited frequency of oscillation of the electrode.

The inventors therefore proposed a rotary arc-welding method, as a welding method which can solve the above-mentioned problems, disclosed in Japanese Patent Provisional Publication No. 133,871/80 dated Oct. 18, 1980 (hereinafter referred to as the "prior art"), which comprises the following steps.

An embodiment of the prior art is described with reference to FIG. 1.

In FIG. 1, 1 and 1' are the objects of welding; 2 is an I-shaped groove; and, 3 is a nozzle inserted vertically into the groove 2. Said nozzle 3 is rotatably fitted to a holder 4 fixed to the leading end of an arm described later around the axis thereof. Also in FIG. 1, 5 is a gear fixed to the top portion of the nozzle 3; 6 is another gear engaging with the gear 5, said gear 6 being rotated by a motor 7 fixed onto said arm; 8 is a tip fixed to the lower surface of the nozzle 3 at a position eccentric from the center axial line of the nozzle 3; 9 is a consumable electrode fed continuously from the end of the tip 8 through the nozzle 3 and the tip 8 toward the groove 2 by a feed roller 10; 11 are rails laid in parallel with the weld line on one of the objects of welding 1'; 12 is a carriage travelling on the rails 11 by means of wheels (not shown); 13 is a vertical screw stock fitted vertically to the carriage 12 through a fitting member 14; 15 is a motor, fixed to the top portion of the fitting member 14, for rotating the screw stock 13; and, 16 is an arm with one end screw-connected with the screw stock 13 and the other end fixed to a side wall of the holder 4.

A welding electric power source (not shown) is connected between said objects of welding 1 and 1' and said electrode 9. Welding current may be supplied to the electrode 9 either through the feed roller 10 or through the nozzle 3.

Another nozzle (not shown) for blowing an inert gas is provided near the tip portion of the nozzle 3 to permit ejection of the inert gas toward the weld zone during welding. When a bore for blowing inert gas is provided at the tip of said nozzle 3, it is not necessary to provide said nozzle for blowing inert gas.

Welding is carried out by setting the center axial line of the nozzle 3 at the center in the width direction of the groove 2 (hereinafter simply referred to as the center of the groove 2), and moving the carriage 12 while rotating the nozzle 3 through the gears 5 and 6 driven by the motor 7. When welding of a first layer has thus been completed, welding of a second layer is conducted after raising the nozzle 3 by a prescribed height through the screw stock 13 and the arm 16 by driving the motor 15. The above-mentioned operations are thus repeated to complete welding of the objects of welding 1 and 1'.

Since the tip 8 which guides the leading end of the electrode 9 is fixed at a position eccentric from the center axial line of the nozzle 3, an arc produced between the leading end of the electrode 9 and the objects of welding 1 and 1' follows a horizontal circular movement within the groove 2.

A wide arc having a certain width is thus obtained and reaches sufficiently to the groove corners. In addition, there is no risk of the electrode 9 coming too close to the groove face or coming into contact with the groove face, thus providing such useful effects as the formation of a sound bead and a higher welding efficiency.

The above-mentioned prior art has however the following problems.

More particularly, when the rails 11 laid on the object of welding 1' are not perfectly in parallel with the weld line, or when the groove 2 curves in the middle thereof although the rails 11 are laid straight, the center axial line of the electrode 9 (the center of rotation of the arc in circular movement) is not located at the center of the groove 2, and the arc in circular movement deviates toward either of the groove faces. As a result, the amount of penetration into the objects of welding 1 and 1' becomes non-constant, thus preventing a uniform bead from being formed.

When the object of welding 1' on which the rails 11 are laid curves up and down, the nozzle 3 moving up and down accordingly causes variation in the distance between the tip of the electrode 9 and the weld zone. As a result, the amount of penetration at the weld zone becomes non-constant, thus preventing a uniform bead from being formed.

Now, a change in welding current with rotation of the nozzle is described for the cases where the center of nozzle rotation is and is not located at the center of the groove.

As shown in FIG. 2(A), when the center axial line "a" of the nozzle 3 is located at the center "b" of the groove 2, the tip of the electrode 9 moves in a circle at the width center of the groove 2, as shown in FIG. 2(B). Along with rotation of the electrode 9, welding current varies as shown in FIG. 2(C). Suppose that the value of electric current when the tip of the electrode 9 is located at the center "b" of the groove 2 is "$I_o$", and the points at which said tip is located on a vertical plane in parallel with the welding direction are "a'" and "a''", then, welding current becomes larger according as said tip comes closer to one of the groove faces 2', takes a maximum value when said tip is closest to one of the groove faces 2', and becomes smaller according as the tip is then separated from said groove face 2' to become "$I_o$" at position "a''". Then, welding current becomes larger again to reach the maximum value again when the tip becomes closest to the other groove face 2''. Welding current thus takes the form of a current varying with a certain amplitude.

As shown in FIG. 3(A), on the other hand, when the center axial line "a" of the nozzle 3 deviates from the center "b" of the groove 2 toward the object of welding 1, the tip of the electrode 9 moves in a circle on a location eccentric toward one of the groove faces 2', as shown in FIG. 3(B). Rotation of the electrode 9 causes change in welding current as shown in FIG. 3(C). Said welding current becomes larger according as the tip of the electrode 9 comes closer to one of the groove faces 2', takes a maximum value when said tip is closest to one of the groove faces 2', and becomes smaller according as the tip is then separated from said groove face 2', to a value slightly larger than "$I_o$" at position "a'". Welding current becomes "$I_o$" when said tip comes to the center "b" of the groove 2, and becomes larger according as the tip becomes closer to the groove face 2''; but does not take said maximum value even when the tip becomes closest to the groove face 2'', but a considerably smaller current value. Thus, welding current becomes a current of which the amplitude varies every half a cycle.

As mentioned above, variation in welding current with rotation of the nozzle 3 causes the penetration into one object of welding 1 to become excessive as compared with the penetration into another object of welding 1', thus preventing a uniform bead from being formed.

SUMMARY OF THE INVENTION

An object of the present invention is therefore to provide a rotary arc-welding method which permits welding by aligning the center axial line of a nozzle always with the center of a groove, and also permits welding while maintaining the distance between the tip of an electrode and the groove always at a prescribed distance.

In accordance with one of the features of the present invention, there is provided a rotary arc-welding method which comprises:

directing a nozzle substantially vertically toward a groove formed between objects of welding; directing a welding electrode through said nozzle eccentrically from the center axial line of said nozzle and substantially vertically toward said groove; feeding a welding current of a prescribed voltage and a prescribed current to said welding electrode to produce an arc between the tip of said welding electrode and said groove to weld said objects of welding with each other along said groove by means of the arc heat; rotating said nozzle to cause a circular movement of said arc from the tip of said welding electrode corresponding to the eccentricity thereof; and, feeding a shielding gas toward said groove to shield said arc and said groove from the open air;

the improvement characterized by:

continuously detecting, for each one rotation of said nozzle, a value of variation of one of said voltage and said current of said welding current, for each of the left half cycle and the right half cycle relative to a vertical plane parallel to the welding direction and including said center axial line of said nozzle;

smoothing, for said each one rotation, respective values for said left half cycle and said right half cycle of said detected value of variation;

calculating, for said each one rotation, the difference between the thus smoothed respective values for said left half cycle and said right half cycle of said detected value of variation; and, controllably moving, for said each one rotation, said nozzle at right angles to said welding direction so that said calculated difference becomes null;

thereby aligning said center axial line of said nozzle with the center of the two opposite faces of said groove.

In addition, in accordance with another feature of the present invention, there is provided a rotary arc-welding method, which comprises:

directing a nozzle substantially vertically toward a groove formed between objects of welding; directing a welding electrode through said nozzle eccentrically from the center axial line of said nozzle and substantially vertically toward said groove; feeding a welding current of a prescribed voltage and a prescribed current to said welding electrode to produce an arc between the tip of said welding electrode and said groove to weld said objects of welding with each other along said groove by means of the arc heat; rotating said nozzle to cause a circular movement of said arc from the tip of said welding electrode corresponding to the eccentricity thereof; and, feeding a shielding gas toward said groove to shield said arc and said groove from the open air;

the improvement characterized by:

smoothing, for said each one rotation, said value of variation of one of said voltage and said current of said welding current;

calculating, for said each one rotation, the difference between the thus smoothed value of variation and the corresponding one of said prescribed voltage and said prescribed current; and, controllably moving, for said each one rotation, said nozzle vertically so that said calculated difference becomes null;

thereby maintaining the distance between the tip of said electrode and said groove at a prescribed distance.

According to the rotary arc-welding method of the present invention, it is possible to conduct welding by aligning the center axial line of the nozzle always with the center of the groove, and while maintaining the distance between the tip of the electrode and the weld zone always at a prescribed distance, thus enabling to form a uniform bead.

DETAILED DESCRIPTION OF THE PREFERRED EMBODIMENTS

Now, an embodiment of the rotary arc-welding method of the present invention is described with reference to the drawings.

Figure 4:
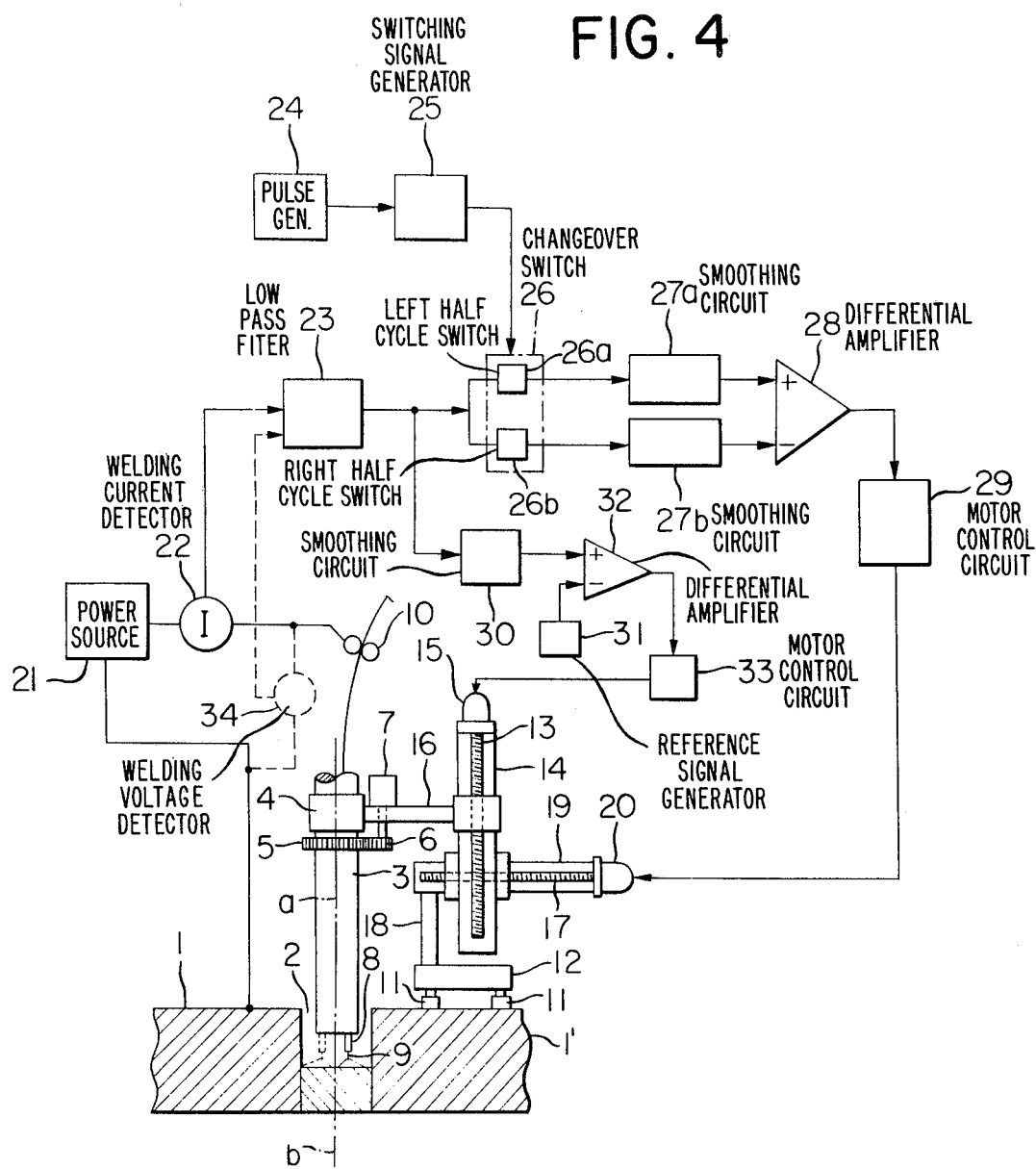

FIG. 4 is a block diagram showing an embodiment for carrying out the rotary arc-welding method of the present invention.

Figure 1:
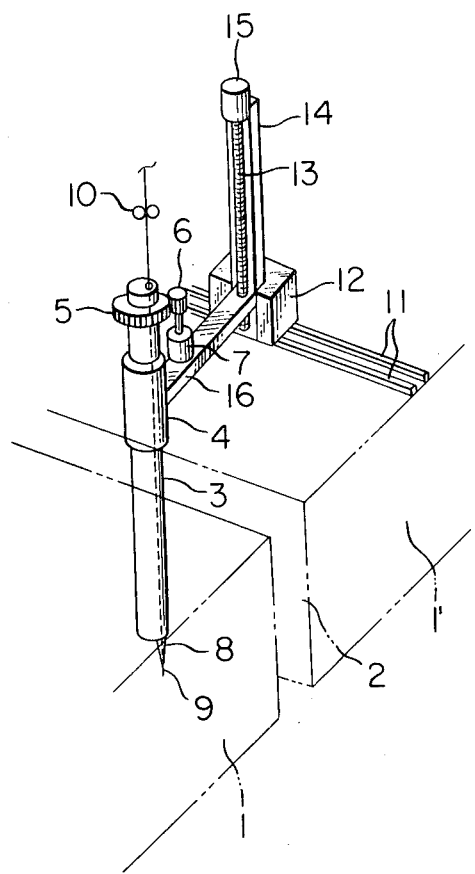
FIG. 1 is a perspective view illustrating an embodiment of the rotary arc-welding method of the prior art.

In FIG. 4, the reference numerals 1 and 1' through 16 represent the same parts as in FIG. 1.

The nozzle 3 rotates within the groove 2 via the gears 5 and 6 through driving of the motor 7, and by rotating the vertical screw stock 13 by the motor 15, the nozzle 3 moves vertically up and down via the arm 16.

The difference from FIG. 1 lies in that the fitting member 14 fitted with the vertical screw stock 13 is screw-connected with a horizontal screw stock 17 horizontally fitted onto the carriage 12. The horizontal screw stock 17 is fitted to a fitting member 19 fixed horizontally through an arm 18 onto the carriage 12, and is rotated by a motor 20 installed at an end of the fitting member 19.

The present invention is characterized by locating the center axial line of the nozzle 3 at the center of the groove 2 through control of rotation of the motor 20 for driving said horizontal screw stock 17, and furthermore, maintaining the distance between the tip of the electrode 9 and the weld zone always at a prescribed distance as required through control of rotation of the motor 15 for driving said vertical screw stock 13.

Now, control of rotation of said motors 15 and 20 is described.

Figure 2A:
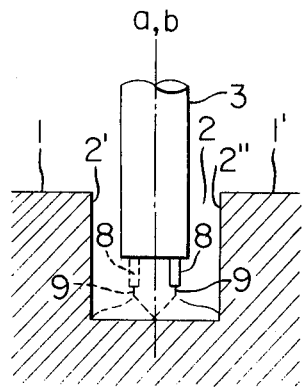
FIG. 2(A) is a front view illustrating welding in the case where the center axial line of the nozzle is located at the center of the groove.
Figure 2B:
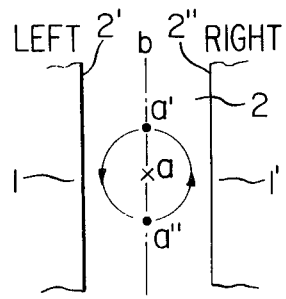
FIG. 2(B) is a plan view illustrating the locus of an arc moving in a circle in the case where the center axial line of the nozzle is located at the center of the groove.
Figure 2C:
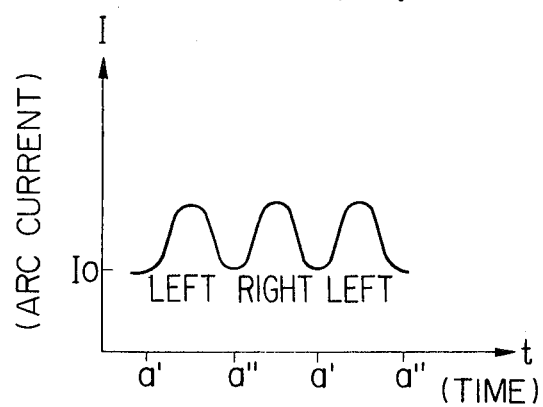
FIG. 2(C) is a graph showing variation in welding current with rotation of the electrode in the case where the center axial line of the nozzle is located at the center of the groove.
Figure 3A:
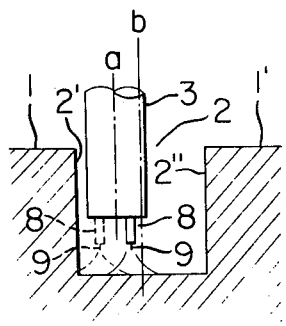
FIG. 3(A) is a view illustrating a welding in the case where the center axial line of the nozzle comes off from the center of the groove.
Figure 3B:
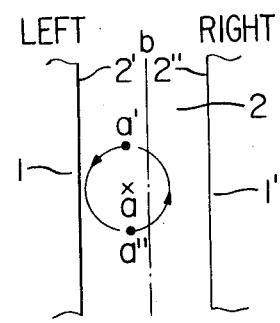
FIG. 3(B) is a plan view illustrating the locus of an arc moving in a circle in the case where the center axial line of the nozzle comes off from the center of the groove.
Figure 3C:
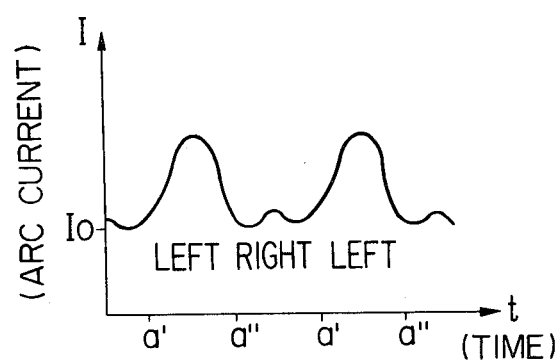
FIG. 3(C) is a graph showing variation in welding current with rotation of the electrode in the case where the center axial line of the nozzle comes off from the center of the groove; and, FIG. 4 is a block diagram showing an embodiment for carrying out the method of the present invention.

In FIG. 4, 21 is a welding electric power source connected between the object of welding 1' and the feed roller 10; 22 is a welding current detector connected between the feed roller 10 and the welding electric power source 21; 23 is a low-pass filter which eliminates detrimental noise signals from a detected welding current; 24 is a pulse generator circuit, said circuit 24 producing a pulse at the moment when the tip of the electrode 9 reaches the points "a'" and "a''" in FIGS. 2(B) and 3(B); 25 is a switching signal generator circuit producing a switching signal in response to said pulse; and, 26 is a changeover switch. Said switch 26 comprises a left half cycle switch 26a and a right half cycle switch 26b, and these switches 26a and 26b are switched over every half a cycle by a switching signal from said circuit 25. When said switch 26a is turned on by a switching signal from said circuit 25, welding current of the left half cycle from the low-pass filter 23 (from a' to a'') is sent to a smoothing circuit 27a described later. On the other hand, when said switch 26b is turned on by a switching signal from said circuit 25, welding current of the right half cycle from the low-pass filter 23 (from a'' to a') is sent to another smoothing circuit 27b described later. The smoothing circuit 27a comprises an integrator for smoothing welding current of the left half cycle. The another smoothing circuit 27b comprises an integrator for smoothing welding current of the right half cycle. 28 is a differential amplifier for calculating the difference between the smoothed welding current of the left half cycle and the smoothed welding current of the right half cycle respectively from the smoothing circuits 27a and 27b, and amplifying this differential current to a certain level. 29 is a motor control circuit. Said circuit 29 feeds electric current to the motor 20 until the differential current from the differential amplifier 28 becomes null or a prescribed allowable value, which allows movement of the nozzle 3 in the width direction of the groove 2 until the center axial line of the nozzle 3 is located at the center of the groove 2. The reference numeral 30 represents a smoothing circuit comprising an integrator for smoothing the welding current from which noise signals have been eliminated by the low-pass filter 23; 31 is a reference signal generator circuit, said circuit 31 producing a current equivalent to a prescribed welding current; 32 is a differential amplifier which calculates the difference between the smoothed welding current from the smoothing circuit 30 and said reference signal and amplifies this differential current to a certain level; and, 33 is a motor control circuit. Said circuit 33 supplies current to the motor 15 until the differential current from the differential amplifier 32 becomes null or a prescribed allowable value, and thus allows movement of the nozzle 3 in the height direction of the groove 2 until the distance between the tip of the electrode 9 and the weld zone becomes a prescribed distance.

The welding current from which noise signals have been eliminated by the low-pass filter 23 is switched over every half a cycle by the changeover switch 26, and welding current for the left half cycle and the right half cycle is smoothed respectively by the smoothing circuits 27a and 27b. These smoothed values of welding current for the left half cycle and the right half cycle are compared by the differential amplifier 28 to calculate the difference. When the center axial line of the nozzle 3 is located at the center of the groove 2, said differential current is null, whereas, when said center axial line comes off from said center, the motor 20 is driven by the motor control circuit 29 until said differential current becomes null or a prescribed allowable value of current. As a result, the nozzle 3 moves in said width direction until the center axial line of the nozzle 3 is located at the center of the groove 2, and the arc moves in a circle across the center of the groove 2.

On the other hand, the welding current from the low-pass filter 23 is smoothed by the smoothing circuit 30 and compared with the reference signal from the reference signal generator circuit 31 by the differential amplifier 32 to calculate the difference. If the distance between the tip of the electrode 9 and the weld zone is equal to a prescribed distance, said differential current is null, but if said distance is not equal to the prescribed distance, the motor 15 is driven by the motor control circuit 33 until said differential current becomes null or a prescribed allowable value of current. As a result, the nozzle 3 moves in the height direction of the groove 2 until the distance between the tip of the electrode 9 and the weld zone becomes equal to a prescribed distance, thus producing an optimum arc.

In the example described above, the nozzle position has been controlled through detection of welding current, but it is also possible to control the nozzle position by detecting welding voltage. In this case, a welding voltage detector 34 is connected between the welding wire 9 and the object of welding 1', and the detected welding voltage is sent to the low-pass filter 23 (refer to FIG. 4).

Also when welding a V-shaped groove by the above-mentioned method, effects similar to those described above are available.

Furthermore, the welding wire 9 may be a non-consumable electrode.

According to the rotary arc-welding method of the present invention, as described above, it is possible to effect welding with the center axial line of the nozzle located always at the center of the groove, and while maintaining the distance between the tip of the electrode and the weld zone always at a prescribed distance, enabling to form a uniform bead, thus providing industrially very useful effects.

What is claimed is:

1. In a rotary arc-welding method, which comprises: directing a nozzle substantially vertically toward a groove formed between objects of welding; directing a welding electrode through said nozzle eccentrically from the center axial line of said nozzle and substantially vertically toward said groove; feeding a welding current of a prescribed voltage and a prescribed current to said welding electrode to produce an arc between the tip of said welding electrode and said groove to weld said objects of welding with each other along said groove by means of the arc heat; rotating said nozzle to cause a circular movement of said arc from the tip of said welding electrode corresponding to the eccentricity thereof; feeding a shielding gas toward said groove to shield said arc and said groove from the open air; detecting at least once, for each one rotation of said nozzle, a value of variation of one of said voltage and said current of said welding current, for each of the left half cycle and the right half cycle relative to a vertical plane parallel to the welding direction and including said center axial line of said nozzle; calculating, for said each one rotation, the difference between respective values for said left half cycle and said right half cycle of said detected value of variation; and, controllably moving, for said each one rotation, said nozzle at right angles and horizontally to said welding direction so that said calculated difference becomes null; the improvement comprising:

continuously detecting, for each one rotation of said nozzle, said value of variation for each of said left half cycle and said right half cycle;

smoothing, for said each one rotation, respective values for said left half cycle and said right half cycle of said detected value of variation;

calculating, for said each one rotation, the difference between the thus smoothed respective values for said left half cycle and said right half cycle of said detected value of variation; and, controllably moving, for said each one rotation, said nozzle at right angles and horizontally to said welding direction so that said calculated difference becomes null;

thereby aligning said center axial line of said nozzle with the center of the two opposite faces of said groove.

2. In a rotary arc-welding method, which comprises directing a nozzle substantially vertically toward a groove formed between objects of welding; directing a welding electrode through said nozzle eccentrically from the center axial line of said nozzle and substantially vertically toward said groove; feeding a welding current of a prescribed voltage and a prescribed current to said welding electrode to produce an arc between the tip of said welding electrode and said groove to weld said objects of welding with each other along said groove by means of the arc heat; rotating said nozzle to cause a circular movement of said arc from the tip of said welding electrode corresponding to the eccentricity thereof; feeding a shielding gas toward said groove to shield said arc and said groove from the open air; detecting at least once, for each one rotation of said nozzle, a value of variation of one of said voltage and said current of said welding current; calculating, for said each one rotation, the difference between said detected value of variation and the corresponding one of said prescribed voltage and said prescribed current; and, controllably moving, for said each one rotation, said nozzle vertically so that said calculated difference becomes null;

the improvement comprising:

continuously detecting, for each one rotation of said nozzle, said value of variation;

smoothing, for said each one rotation, said detected value of variation;

calculating, for said each one rotation, the difference between the thus smoothed value of variation and the corresponding one of said prescribed voltage and said prescribed current; and, controllably moving, for said each one rotation, said nozzle vertically so that said calculated difference becomes null;

thereby maintaining the distance between the tip of said welding electrode and said groove at a prescribed distance.

* * * * *